US012807502B2

(12) United States Patent

Nakanishi

(10) Patent No.: US 12,807,502 B2
(45) Date of Patent: Nov. 24, 2026

(54) METHOD OF PRODUCING ACTIVE MATERIAL COMPOSITE PARTICLE AND METHOD OF PRODUCING SECONDARY BATTERY

(71) Applicant: TOYOTA JIDOSHA KABUSHIKI KAISHA, Toyota (JP)

(72) Inventor: Azusa Nakanishi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 435 days.

(21) Appl. No.: 18/601,172

(22) Filed: Mar. 11, 2024

(65) Prior Publication Data

US 2024/0327228 A1 Oct. 3, 2024

(30) Foreign Application Priority Data

Mar. 31, 2023 (JP) ................................ 2023-058139

(51) Int. Cl.
*H01M 4/36* (2006.01)
*C01B 33/021* (2006.01)
(Continued)

(52) U.S. Cl.
CPC ........... *C01B 33/021* (2013.01); *H01M 4/366* (2013.01); *H01M 4/386* (2013.01); *H01M 4/623* (2013.01); *H01M 2004/027* (2013.01)

(58) Field of Classification Search
CPC ...... H01M 4/366; H01M 4/386; H01M 4/623; H01M 2004/027; H01M 10/0525;
(Continued)

(56) References Cited

U.S. PATENT DOCUMENTS

| | | | | |
|---|---|---|---|---|
| 9,692,049 | B2 * | 6/2017 | Hwang | H01M 4/0404 |
| 11,476,949 | B2 * | 10/2022 | Campos | H04B 10/61 |
| 2021/0043927 | A1 * | 2/2021 | Yang | H01M 10/0525 |

FOREIGN PATENT DOCUMENTS

| | | | | |
|---|---|---|---|---|
| CN | 110600718 A | * 12/2019 | | H01M 4/628 |
| CN | 113871604 A | 12/2021 | | |
| JP | 2019-021571 A | 2/2019 | | |

OTHER PUBLICATIONS

Yang, L., Li, H., Liu, J et al. Dual yolk-shell structure of carbon and silica-coated silicon for high-performance lithium-ion batteries. Sci Rep 5, 10908 (2015). (Year: 2015).*

(Continued)

*Primary Examiner* — Scott W Dodds
*Assistant Examiner* — Arti Khanal
(74) *Attorney, Agent, or Firm* — Oliff PLC

(57) ABSTRACT

A method of producing an active material composite particle comprising Si and having excellent cycling properties is disclosed. The method of producing an active material composite particle according to the present disclosure includes obtaining a granulated body containing a simple substance of Si as a first component, a component other than the simple substance of Si as a second component, and a polymer (Step S1); and applying acid treatment to the granulated body to remove the second component from the granulated body while remaining the first component and the polymer in the granulated body, thereby forming a void in the granulated body (Step S2).

5 Claims, 2 Drawing Sheets

(51) Int. Cl.
*H01M 4/02* (2006.01)
*H01M 4/38* (2006.01)
*H01M 4/62* (2006.01)

(58) Field of Classification Search
CPC .... H01M 4/134; H01M 4/362; H01M 10/058; H01M 2004/021
See application file for complete search history.

(56) References Cited

OTHER PUBLICATIONS

Lee, JP., Choi, S. & Park, S. Preparation of silica nanospheres and porous polymer membranes with controlled morphologies via nanophase separation. Nanoscale Res Lett 7, 440 (2012). (Year: 2012).*
Machine Translation for CN 110600718 A (Year: 2026).*

* cited by examiner

METHOD OF PRODUCING ACTIVE MATERIAL COMPOSITE PARTICLE AND METHOD OF PRODUCING SECONDARY BATTERY

FIELD

The present application discloses a method of producing an active material composite particle and a method of producing a secondary battery.

BACKGROUND

PTL 1 discloses a granulated body of a negative electrode active material comprising a binder and a composite body of Si and carbon.

CITATION LIST

Patent Literature

[PTL 1] JP 2019-0211571 A

SUMMARY

Technical Problem

Active materials containing Si have room for improved cycling properties.

Solution to Problem

As a means for solving the above problem, the present application discloses the following plurality of aspects.

<Aspect 1>

A method of producing an active material composite particle, the method comprising:

- obtaining a granulated body containing a simple substance of Si as a first component, a component other than the simple substance of Si as a second component, and a polymer; and
- applying acid treatment to the granulated body to remove the second component from the granulated body while remaining the first component and the polymer in the granulated body, thereby forming a void in the granulated body.

<Aspect 2>

The method of Aspect 1, wherein the second component is $SiO_2$.

<Aspect 3>

The method of Aspect 1 or 2, wherein the acid treatment comprises hydrofluoric acid treatment.

<Aspect 4>

The method of any of Aspects 1 to 3, wherein the polymer comprises a fluorine-containing polymer.

<Aspect 5>

A method of producing a secondary battery, the method comprising:

- obtaining an active material composite particle by the method of any of Aspects 1 to 4; and
- using the active material composite particle to obtain a negative electrode active material layer.

Effects

The active material composite particle of the present disclosure has excellent cycling characteristics.

DESCRIPTION OF EMBODIMENTS

1. Method of Producing an Active Material Composite Particle

Figure 1:
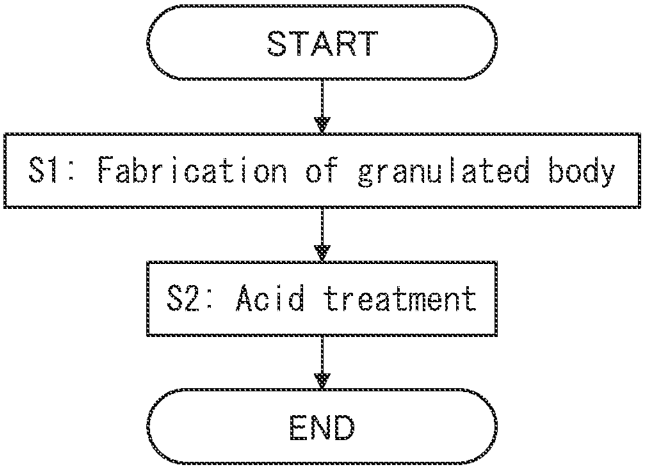
FIG. 1 shows an example of a flow of a method of producing an active material composite particle.
Figure 2:
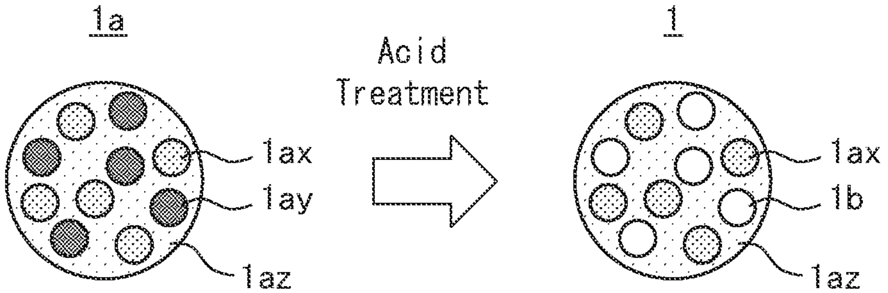
FIG. 2 schematically shows the state of each of the granulated body before the acid treatment and the active material composite particle after the acid treatment.

With reference to FIGS. 1 and 2, a method of producing an active material composite particle according to an embodiment will be described. As shown in FIGS. 1 and 2, the method of producing the active material composite particle 1 according to an embodiment comprises

- Step S1: obtaining a granulated body 1*a* containing a simple substance of Si as a first component 1*ax*, a component other than the simple substance of Si as a second component 1*ay*, and a polymeric 1*az*, and
- Step S2: applying acid treatment to the granulated body 1*a* to remove the second component 1*ay* from the granulated body 1*a* while remaining the first component 1*ax* and the polymeric 1*az* in the granulated body 1*a*, thereby forming a void 1*b* in the granulated body 1*a*.

1.1 Step S1

In the step S1, a granulated body 1*a* containing a simple substance of Si as a first component 1*ax*, a component other than the simple substance of Si as a second component 1*ay*, and a polymeric 1*az* is obtained.

1.1.1 First Component

The first component 1*ax* is a simple substance of Si. As compared with the second component 1*ay*, the simple substance of Si as the first component 1*ax* is difficult to be removed by the acid treatment described later, and tends to remain in the granulated body 1*a* even after the acid treatment. The simple substance of Si as the first component 1*ax* may exist as particles, for example. In other words, in the step S1, particles (Si particles) containing a simple substance of Si as the first component 1*ax* may be used.

Si particles may be present as primary particles or as secondary particles. The chemical composition of Si particles is not particularly limited. The ratio of Si element to all elements contained in Si particles may be, for example, 50 mol % or more, 70 mol % or more, or 90 mol % or more. In addition to Si element, Si particles may contain other elements such as an alkali-metal element such as Li. In addition to alkali metal elements such as Li, Sn, Fe, Co, Ni, Ti, Cr, B, P and the like can be mentioned as another element. In addition, Si particles may contain impurities such as oxides. The simple substance of Si contained in the particle may be an amorphous Si or a crystalline Si. The crystalline phase contained in the particle is not particularly limited.

The size of Si particles is not particularly limited. The average primary particle diameter of Si particles may be, for example, 10 nm or more, 30 nm or more, 50 nm or more, 100 nm or more, or 150 nm or more, and may be 10 μm or less, 5 μm or less, 3 μm or less, 2 μm or less, or 1 μm or less. Further, the average secondary particle diameter of Si particles may be, for example, 100 nm or more, 1 μm or more, or 2 μm or more, and may be 20 μm or less, 15 μm or less, or 10 μm or less. Incidentally, the average primary particle diameter and the average secondary particle diameter can be determined by observation using an electronic-microscope such as SEM, for example, it is determined as the number average value of the maximum Ferre diameter of each of the plurality of particles. The number of samples depends on the number of Si particles contained in the granulated body 1*a*, but is preferably large. The number of samples may be, for example, 1 or more, 2 or more, 5 or more, 20 or more, 50 or more, or 100 or more. Average primary particle diameter and average secondary particle diameter can be appropriately adjusted by, for example, changing the manufacturing conditions of Si particles, or by performing the classification process.

Si particles may be porous. In the case that Si particles are porous, the expansion of Si particles during charging can be alleviated by voids in the Si particles. There is no particular limitation on the morphology of the voids in the porous Si particles. The porous Si particles may be particles comprising nanoporous silicon. Nanoporous silicon refers to silicon in which a plurality of pores having a pore diameter on the order of nanometers (less than 1000 nm, preferably 100 nm or less) are present. The porous Si particles may include pores having a diameter of 55 nm or less. Pores having a diameter of 55 nm or less are hard to crush even by pressing. In other words, the porous Si particles containing pores having a diameter of 55 nm or less tend to be maintained porous state thereof even after pressing. For example, porous silicon particles (1 g) may contain 0.21 cc or more, 0.22 cc/g or more, or 0.23 cc/g or more of pores having a diameter of 55 nm or less, and may contain 0.30 cc/g or less, 0.28 cc/g or less, or 0.26 cc/g or less of pores having a diameter of 55 nm or less. The amount of the pores having the diameter of 55 nm or less contained in the porous Si particles can be determined, for example, from the pore size distribution by the nitrogen-gas adsorption method and DFT method.

When Si particles are porous, the void ratio thereof is not particularly limited. The porosity of the porous Si particles may be, for example, 1% or more, 5% or more, 10% or more, or 20% or more, and may be 80% or less, 70% or less, 60% or less, 50% or less, 40% or less, or 30% or less. The porosity of the Si particles can be determined, for example, by observation or the like using a scanning-electron-microscope (SEM). The larger the number of samples, the better and is, for example, 100 or more. The porosity can be defined as the average value obtained from these samples.

When the first component 1*ax* is contained as Si particles, the number of Si particles contained in one granulated body 1*a* is not particularly limited. The number may be 1 or more, 2 or more, 5 or more, 10 or more, or 50 or more, and may be 1000 or less, 500 or less, or 100 or less.

1.1.2 Second Component

The second component 1*ay* is a component other than the simple substance of Si. The second component 1*ay* is removed by the acid treatment described later. In other words, the second component 1*ay* may be a component that dissolves in a predetermined acid. For example, the second component 1*ay* may be $SiO_2$. When the second component 1*ay* is $SiO_2$, most of it can be easily removed from the granulated body 1*a* by the acid treatment described later. Further, even if a part of $SiO_2$ remains in the granulated body 1*a* after the acid treatment, it is difficult to adversely affect the electrochemical reaction as an active material (such as a de-insertion reaction of carrier ions). The second component 1*ay* may be present as particles. In other words, in the Step S1, particles containing the second component 1*ay* (second particles) may be used. For example, in the Step S1, the particle containing $SiO_2$ as the second component ($SiO_2$ particle) may be used.

The second particles may be present as primary particles or may be present as secondary particles. The second particles may be, for example, $SiO_2$ particles as described above. $SiO_2$ content in the $SiO_2$ particles may be, for example, 50% by mass or more and 100% by mass or less, 70% by mass or more and 100% by mass or less, or 90% by mass or more and 100% by mass or less. The $SiO_2$ particles may contain other elements, compounds, and impurities in addition to $SiO_2$.

The size of the second particles is not particularly limited. The average primary particle diameter of the second particle may be, for example, 10 nm or more, 30 nm or more, 50 nm or more, 100 nm or more, or 150 nm or more, and may be 10 μm or less, 5 μm or less, 3 μm or less, 2 μm or less, or 1 μm or less. In addition, the average secondary particle diameter of the second particle may be, for example, 100 nm or more, 1 μm or more, or 2 μm or more, and may be 20 μm or less, 15 μm or less, or 10 μm or less. Incidentally, the average primary particle diameter and the average secondary particle diameter can be determined by observation using an electronic microscope such as a SEM, for example, it is determined as the number average of the maximum Ferre diameter of each of the plurality of particles. The number of samples depends on the number of second particles contained in the granulated body 1*a*, but is preferably large. The number of samples may be, for example, 1 or more, 2 or more, 5 or more, 20 or more, 50 or more, or 100 or more. The average primary particle diameter and the average secondary particle diameter can be appropriately adjusted by, for example, changing the manufacturing conditions of the second particles or performing the classification process.

When the second component 1*ay* is contained as the second particle, the number of the second particles contained in one granulated body 1*a* is not particularly limited. The number may be 1 or more, 2 or more, 5 or more, 10 or more, or 50 or more, and may be 1000 or less, 500 or 100 or less.

1.1.3 Polymer

The polymer 1*az* may function as, for example, a binder for binding the first component 1*ax* described above and maintaining the shape of the active material composite particle 1. The polymer 1*az* may also serve as a cushioning material. The type of the polymer 1*az* is not particularly limited. As the polymer 1*az*, various binders known as constituent materials of secondary batteries may be employed. For example, the polymer 1*az* may be at least one selected from a butadiene rubber (BR) based binder, a butylene rubber (IIR) based binder, an acrylate butadiene rubber (ABR) based binder, a styrene butadiene rubber (SBR) based binder, a polyvinylidene fluoride (PVdF) based binder, a polytetrafluoroethylene (PTFE) based binder, a polyimide (PI) based binder, a carboxy methylcellulose (CMC) based binder, a polyacrylate based binder, a polyacrylate ester based binder, and the like. In particular, when the polymer 1*az* contains a fluorine-containing polymer, in particular when contains one or both of a polyvinylidene fluoride (PVdF) based binder and a polytetrafluoroethylene (PTFE) based binder, in particular when contains PVdF based binder, a higher performance is easily secured. PVdF based binder may be a copolymer having units derived from monomers other than VdF. Only one kinds of the polymer 1*az* may be used alone, or two or more kinds thereof may be used in combination.

1.1.4 Content of Each Ingredient

In the granulated body 1*a*, the content of each of the first component 1*ax*, the second component 1*ay*, and the polymer 1*az* described above is not particularly limited. For example, the granulated body 1*a* may contain 50% by mass or more and less than 100% by mass of the first component 1*ax*, more than 0% by mass and less than 50% by mass of the second component 1*ay*, and more than 0% by mass and less than 50% by mass of the polymer 1*az*. Alternatively, the granulated body 1*a* may contain 60% by mass or more and 90% by mass or less of the first component 1*ax*, 5% by mass or more and 30% by mass or less of the second component 1*ay*, and more than 5% by mass and 30% by mass or less of the polymer 1*az*.

1.1.5 Other Ingredients

The granulated body 1*a* may be composed of only the first component 1*ax*, the second component 1*ay* and the polymer 1*az* described above, or may contain other components other than these. Examples of other components include various solid components and liquid components.

1.1.6 Obtaining the Granulated Body

In the step S1, for example, the first component 1*ax*, the second component 1*ay*, and the polymer 1*az* described above may be mixed in a dry manner to adhere the respective components to each other, thereby obtaining a granulated body 1*a*. In this case, there is no particular limitation on the mixing means, and it may be mixed by hand using a mortar or the like, or may be mechanically mixed by various mixing devices. Alternatively, in the step S1, a slurry or solution containing the first component 1*ax*, the second component 1*ay* and the polymer 1*az* described above may be obtained, and the slurry or solution may be dried to obtain a granulated body 1*a*. For example, by dissolving a polymer 1*az* in a solvent to obtain a polymer solution, dispersing Si particles as the first component 1*ax* in the polymer solution and the second particles (e.g., $SiO_2$ particles) as the second component 1*ay* to obtain a slurry, and then drying the slurry, whereby it is possible to obtain a granulated body 1*a* in which Si particles and the second particles are bound via the polymer 1*az*. In this case, the type of the solvent is not particularly limited. Further, there is no particular limitation on the means for drying the slurry.

The step S1 may include,

Step S1-1: dropletizing a slurry comprising a first component 1*ax*, a second component 1*ay* and a polymer 1*az* to obtain slurry droplets, and Step S1-2: gas-flow drying the slurry droplets in a heated gas to obtain a granulated body 1*a* comprising a first component 1*ax*, a second component 1*ay* and a polymer 1*az*.

The "slurry" in the step S1-1 may be any suspension containing the first component 1*ax*, the second component 1*ay*, and the polymer 1*az* that has a fluidity enough to be dropletized. "Dropletizing" of the slurry means that the slurry containing the first component 1*ax*, the second component 1*ay* and the polymer 1*az* is made into a particle containing the first component 1*ax*, the second component 1*ay*, the polymer 1*az* and the solvent. There is no particular limitation on the manner in which the slurry containing the first component 1*ax*, the second component 1*ay*, and the polymer 1*az* is dropletized. Examples thereof include a method of making a liquid droplet by spraying a slurry. When the slurry is sprayed, a spray nozzle may be used. Examples of the method of spraying a slurry using a spray nozzle include, but are not limited to, a pressurizing nozzle method and a two fluid nozzle method. Alternatively, the slurry may be dropletized by a rotary atomizer.

In the step S1-1, the size of the slurry droplets is not particularly limited. The diameter (sphere equivalent diameter) of the slurry droplets may be, for example, 0.5 μm or more or 5 μm or more, and may be 5000 μm or less, or 1000 μm or less. The diameter of the slurry droplets can be measured using, for example, a two dimensional image obtained by imaging a slurry droplet, or can be measured using a particle size distribution meter of a laser diffraction type. Alternatively, the droplet diameter can be estimated from the operating conditions and the like of the device for forming the slurry droplets.

"Gas-flow drying" in the step S1-2 means drying the slurry droplets while floating in a hot gas stream. "Gas-flow drying" may include not only drying but also ancillary operation by using a dynamic gas flow. By continuously applying hot gas to the slurry droplets by gas-flow drying, the force continues to be applied to the slurry droplets. Using this, for example, the step S1-2 may include dissolving (granulating) an aggregation of slurry droplets (or an agglomerate of granulated 1*a* each other) by gas flow drying. In other words, in the step S1-2, even when the slurry droplets or the like are excessively aggregated, the aggregate can be crushed by gas-flow drying. Therefore, it is also possible to use a slurry having a low solid concentration, and it is easy to increase the processing speed. Thus, in the step S1-2, by crushing the slurry droplets or the like by gas-flow drying, it is easy to shorten the manufacturing times. In the step S1-2, the above described drying and crushing may be performed simultaneously or may be performed separately. In the step S1-2, the first gas-flow drying in which drying of the slurry droplets becomes dominant, and the second gas-flow drying in which crushing of the aggregate becomes dominant may be performed. Further, the second gas-flow drying may be repeatedly performed.

In the step S1-2, the temperature of the heating gas, the amount of the heating gas supplied (flow rate), the feed rate of the heating gas (flow velocity), and the treatment time (drying time) by the heating gas can be appropriately set in view of the size of the device used, the form of the slurry droplet, and the like. For example, conditions such as those disclosed in JP 2022-047501 A may be employed. In the step S1-2, a heated gas which is substantially inert to the respective components described above may be used. For example, an oxygen-containing gas such as air, an inert gas such as nitrogen or argon, a dry air having a low dew point, or the like can be used.

As an apparatus for performing gas-flow drying, for example, a spray dryer may be used, but is not limited thereto.

1.2 Step S2

In step S2, an acid treatment is applied to the granulated body 1*a* to remove the second component 1*ay* from the granulated body 1*a* while leaving the first component 1*ax* and the polymer 1*az* in the granulated body 1*a*, thereby forming a void 1*b* in the granulated body 1*a*. In other words, by performing an acid treatment on the granulated body 1*a*, the second component 1*ay* is etched.

The acid used for the acid treatment in the step S2 may be any acid capable of removing the second component 1*a* from the granulated body 1*a* while remaining the first component 1*ax* and the polymer 1*az* in the granulated body 1*az*. The acid treatment in the step S2 may include, for example, hydrofluoric acid treatment. In other words, by contacting the granulated body 1*a* with hydrofluoric acid (aqueous hydrofluoric solution), while leaving the first component 1*ax* and the polymer 1*az* in the granulated body 1*a*, the second component 1*ay* contained in the granulated body

1*a* may be dissolved to remove the second component 1*ay* from the granulated body. In the step S2, for example, 50 mol % or more and 100 mol % or less, 70 mol % or more and 100 mol % or less, or 90 mol % or more and 100 mol % or less of the second component 1*ay* contained in the granulated body 1*a* may be dissolved in an acid and removed.

In the step S2, there is no particular limitation on the way in which the granulated body 1*a* and the acid are contacted. The granulated body 1*a* may be immersed in an acid, or an acid may be blown onto the granulated body 1*a*. Alternatively, the granulated body 1*a* may be dispersed in a solvent to form a slurry, and an acid may be added to the slurry, whereby the granulated body 1*a* and the acid may be contacted in the slurry. In this instance, water or various organic solvents can be used as the solvent for dispersing the granulated body 1*a*. For example, an alcohol such as ethanol may be used as a solvent. In the step S2, the duration of the acid-treatment is not particularly limited. For example, the granulated body 1*a* may be dispersed in solvents to form a slurry, and an acid may be added to the slurry and stirred for 1 minutes or more and 10 hours or less. In the step S2, there is no particular limitation on the temperature/atmosphere of the acid-treatment.

1.3 Active Material Composite Particle

After the step S2, optionally filtering, cleaning and drying are performed, and the solid content is recovered, whereby the active material composite particles 1 containing the first component 1*ax* and the polymer 1*az* and having a void 1*b* can be obtained. In the active material composite particles 1, the expansion of Si during charging is absorbed by the void 1*b*, and the expansion of the active material composite particles 1 as a whole becomes small. For example, when the active material composite particles 1 are applied to the negative electrode of the secondary battery, the volume change of the negative electrode accompanying charge and discharge becomes small. Thus, it is possible to suppress the increase and interface peeling or the like of the confining pressure, the cycle characteristics are improved.

1.3.1 Components of the Active Material Composite Particle

The active material composite particle 1 include at least a first component 1*ax* and a polymer 1*az*. The active material composite particle 1 may contain, for example, 50% by mass or more and less than 100% by mass of the first component 1*ax,* 0% by mass or more and 10% by mass or less of the second component 1*ay*, and more than 0% by mass and 50% by mass or less of the polymer 1*az*. Alternatively, the active material composite particle 1 may contain 60% by mass or more and 90% by mass or less of the first component 1*ax,* 0% by mass or more and 5% by mass or less of the second component 1*ay*, and 10% by mass or more and 30% by mass or less of the polymer 1*az*

1.3.2 Particle Size of the Active Material Composite Particle

The active material composite particle 1 can be regarded as a secondary particle comprising a first component 1*ax*, a polymer 1*az* and a void 1*b*. The average particle diameter of the composite particles 1 is not particularly limited. The average particle diameter of the composite particles 1 may be 100 nm or more, 500 nm or more, 1 μm or more, 2 μm or more, or 3 μm or more, and may be 1 mm or less, 500 μm or less, 300 μm or less, 100 μm or less, 50 μm or less, 20 μm or less, 15 μm or less, or 10 μm or less. The average particle diameter of the composite particles 1 can be determined by observation using an electronic-microscope such as SEM, and is determined as, for example, a number-average value of the maximum Ferre diameter of a plurality of composite particles. The number of samples is preferably large, for example, 20 or more, and may be 50 or more, and may be 100 or more. Alternatively, the average particle diameter (D50, median size) of the composite particle 1 measured using a laser regression type particulate distribution measuring device may be 100 nm or more, 500 nm or more, 1 μm or more, 2 μm or more, or 3 μm or more, and may be 1 mm or less, 500 μm or less, 300 μm or less, 100 μm or less, 50 μm or less, 20 μm or less, 15 μm or less, or 10 μm or less.

1.3.3 Structure and Shape of the Active Material Composite Particle

In the active material composite particle 1, the arrangement of the first component 1*ax*, the polymer 1*az*, and the void 1*b* is not particularly limited. In addition, the active material composite particle 1 may have a long diameter and a short diameter, for example, in a state before being applied to a secondary battery. The ratio of the long diameter to the short diameter may be, for example, 1.0 or more or 1.1 or more, and may be 1.3 or less or 1.2 or less.

2. Method of Producing a Secondary Battery

Figure 3:
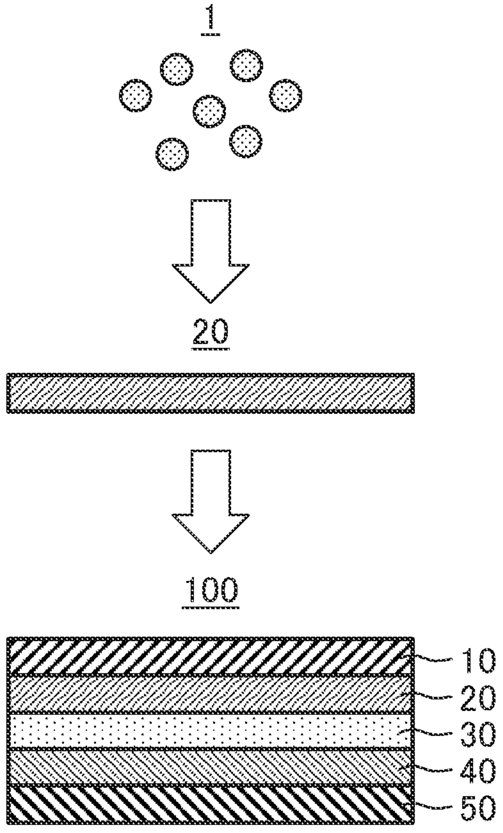
FIG. 3 schematically shows an example of the flow of the method of producing the secondary battery.

The active material composite particle 1 of the present disclosure can be used as a negative electrode active material of a secondary battery, for example. As shown in FIG. 3, a method of producing a secondary battery 100 according to an embodiment includes obtaining active material composite particle 1 by the method of the present disclosure described above, and obtaining a negative electrode active material layer 20 using the active material composite particle 1. The secondary battery 100 may be a lithium ion secondary battery.

The negative electrode active material layer 20 may optionally include other negative electrode active materials, an electrolyte, a conductive aid, a binder, and the like together with the active material composite particle 1. The electrolyte may be, for example, an inorganic solid electrolyte. In this way, when the inorganic solid electrolyte is combined with the active material composite particle 1 in the negative electrode active material layer 20, a more excellent effect according to the technique of the present disclosure is obtained. The inorganic solid electrolyte may be a sulfide solid electrolyte or another inorganic solid electrolyte.

The secondary battery 100 can be manufactured by applying a known method except that the active material composite particle 1 is used as the negative electrode active material. For example, it can be produced as follows. However, the method of manufacturing the secondary battery 100 is not limited to the following method, and each layer may be formed by, for example, dry molding or the like.

(1) The active material composite particles 1 and the like constituting the negative electrode active material layer 20 are dispersed in a solvent to obtain a negative electrode slurry. The solvent used in this case is not particularly limited, and water and various organic solvents can be used. Thereafter, the negative electrode slurry is coated on the surface of the negative electrode current collector 10 or the electrolyte layer 30 described later using a doctor blade or the like, and then dried, whereby the negative electrode active material layer 20 is formed on the surface of the negative electrode current collector 10 or the electrolyte layer 30 Here, the negative electrode active material layer 20 may be press-molded.

(2) A positive electrode active material or the like constituting the positive electrode active material layer 40 is dispersed in a solvent to obtain a positive electrode slurry.

The solvent used in this case is not particularly limited, and water and various organic solvents can be used. Thereafter, using a doctor blade or the like, the positive electrode slurry is coated on the surface of the positive electrode current collector 50 or the electrolyte layer 30 described later, and then dried, whereby the positive electrode active material layer 40 is formed on the surface of the positive electrode current collector 50 or the electrolyte layer 30 Here, the positive electrode active material layer 40 may be press-molded.

(3) Each layer is laminated so as to sandwich the electrolyte layer 30 between the negative electrode active material layer 20 and the positive electrode active material layer 40, and a laminate having a negative electrode current collector 10, a negative electrode active material layer 20, an electrolyte layer 30, a positive electrode active material layer 40, and a positive electrode current collector 50 in this order is obtained. The electrolyte layer may be obtained, for example, by molding an electrolyte mixture containing a solid electrolyte and a binder, and may be obtained by press molding. Here, the laminate may be further press-molded. Other members such as terminals are attached to the laminate as needed. When an electrolytic solution is used, a separator may be employed in the electrolyte layer.

(4) By sealing the laminate housed in the battery case, the secondary battery is obtained.

EXAMPLES

As described above, one embodiment of the technology of the present disclosure has been described, but the technology of the present disclosure can be variously modified other than the above embodiments without departing from the gist thereof. Hereinafter, the technique of the present disclosure will be described in further detail with reference to Examples, but the technique of the present disclosure is not limited to the following Examples.

1. Preparation of Active Material Composite Particles

1.1 Example 1

In dimethyl carbonate of 500 mL, PVdF-HFP (manufactured by Kurcha Co., Ltd.) 1.3 g was added and stirred and dissolved to prepare a polymer solution. To the polymer solutions, 5.0 g of Si particles alone and 1.0 g of $SiO_2$ particles (manufactured by Sigma-Aldrich Co., Ltd., mean particle size 0.1 μm~0.2 μm) were added and dispersed using an ultrasonic homogenizer to obtain a slurry. The slurry was sprayed using a spray dryer (ADL311S manufactured by Yamato Scientific Co., Ltd.) and dried to prepare a granulated body composed of a simple substance of Si, $SiO_2$ and PVdF-HFP.

After dispersing the obtained granulated body 2 g in 100 mL ethanol, 3 mL of 47 wt % aqueous hydrofluoric solution was added thereto. After addition, the mixture was stirred for 3 hours, followed by filtration under reduced pressure to recover active material composite particles. In the active material composite particles, $SiO_2$ contained in the granulated body was removed by the hydrofluoric acid aqueous solution process (hydrofluoric acid treatment), and a void was formed. The obtained active material composite particles were vacuum-dried for 12 hours at 120° C., and used as a negative electrode active material to be described later.

1.2 Comparative Example 1: No Acid Treatment

In Example 1, a granulated body composed of a simple substance Si, $SiO_2$ and PVdF-HFP was used as it is as a negative electrode active material without performing an acid treatment with an aqueous hydrofluoric solution.

1.3 Comparative Example 2: No $SiO_2$

In the polymer solution prepared in the same manner as in Example 1, 5.0 g of a particle with Si alone was added and dispersed using an ultrasonic homogenizer to obtain a slurry. The slurry was sprayed using a spray dryer (ADL311S manufactured by Yamato Scientific Co., Ltd.) and dried to prepare a granulated body composed of a simple substance Si and PVdF-HFP, which was used as a negative electrode active material.

2. Fabrication of all-Solid-State Batteries 2.1 Preparation of Positive Electrode Active Material Layer To a PP container, butyl butyrate as a solvent, 5 wt % butyl butyrate solution with PVDF based binder, and $LiNi_{1/3}Co_{1/3}Mn_{1/3}O_2$ particles (mean particle diameter of 6 μm) as a positive electrode active material, a $Li_2S$—$P_2S_5$ based glass-ceramic as a sulfide solid electrolyte, and VGCF as a conductive auxiliary agent were added, and the mixture was stirred for 30 seconds with an ultrasonic dispersing device (UH-50 manufactured by Esemta Co., Ltd.) Next, the container was shaken with a shaker (TTM-1 manufactured by Shibata Scientific Co., Ltd.) for 3 minutes, and further stirred with an ultrasonic dispersing device for 30 seconds. Thereafter, the mixture was shaken in a shaker for 3 minutes to obtain a positive electrode slurry. Using an applicator, a positive electrode slurry was coated on a Al foil (manufactured by Showa Denko Co., Ltd.) by a blade method, and dried on a hot plate at 100° C. for 30 minutes to form a positive electrode active material layer on a Al foil.

2.2 Preparation of the Negative Electrode Active Material Layer

To a PP container, dibutyl ether and mesitylene as solvents, 5 wt % mesitylene solution of a PVDF based binder, a VGCF as a conductive auxiliary agent, a $Li_2S$—$P_2S_5$ based glass-ceramic as a solid electrolyte, and the above active material composite particles or granulated body as a negative electrode active material were added to a container, and the mixture was stirred for 30 seconds with an ultrasonic dispersing device (UH-50 manufactured by Esemta Co., Ltd.). Next, the container was shaken with a shaker (TTM-1 manufactured by Shibata Science Co., Ltd.) for 30 minutes to obtain a negative electrode slurry. Using an applicator, a negative electrode active material layer was formed on a Cu foil by coating a negative electrode slurry on a Cu foil (made of UACJ) by a blade method and drying on a hot plate at 100° C. for 30 minutes.

2.3 Preparation of the Solid Electrolyte Layer

To a PP container, heptane as a solvent, 5 wt % heptane solution of SBR based binder, and $Li_2S$—$P_2S_5$ based glass-ceramic as a solid electrolyte were added, and the mixture was stirred for 30 seconds in an ultrasonic dispersing device (UH-50 manufactured by Esemta Co., Ltd.). Next, the container was shaken with a shaker (TTM-1 manufactured by Shibata Scientific Co., Ltd.) for 30 minutes to obtain an electrolyte slurry. Solid-state electrolyte layers were formed on Al foils by coating the electrolyte slurries on Al foils as a base material using an applicator for 30 minutes on a hot plate at 100° C.

2.4 Lamination of Each Layer

The positive electrode active material layer and the solid electrolyte layer described above were laminated to obtain a first laminate having a Al foil/positive electrode active material layer/solid electrolyte layer/Al foil. The first laminate was set in a roll press machine and was pressed at pressure of 100 kN/cm and press temperature of 165° C. Thereafter, Al foil as a base material was removed from the first laminate to obtain a positive electrode laminate having a Al foil/positive electrode active material layer/solid electrolyte layer.

The negative electrode active material layer and the solid electrolyte layer described above were laminated to obtain a second laminate having a Cu foil/negative electrode active material layer/solid electrolyte layer/Al foil. The second laminate was set in a roll press machine, and pressed at pressure of 60 kN/cm and press temperature of 25° C. Thereafter, Al foil as a base material was removed from the second laminate to obtain a first negative electrode laminate having a Cu foil/negative electrode active material layer/solid electrolyte layer.

Al foil as the base material and solid electrolyte as a base material and the above-described first negative electrode laminate were laminated so as to be in the order of Al foil/solid electrolyte layer/solid electrolyte layer/negative electrode active material layer/Cu foil to obtain a third laminate. The third laminate was set in a planar uniaxial press machine, at 100 MPa and 25° C., and was temporarily pressed over 10 seconds. Thereafter, Al foil was peeled from the third laminate to obtain a second negative electrode laminate having a solid electrolyte layer/solid electrolyte layer/negative electrode active material layer/Cu foil. Incidentally, the area of the second negative electrode laminate was made to be larger than the area of the above positive electrode laminate.

The fourth laminate was obtained by laminating the above positive electrode laminate and the second negative electrode laminate in the order of Al foil/positive electrode active material layer/solid electrolyte layer/solid electrolyte layer/negative electrode active material layer/Cu foil. The fourth laminate was set in a planar uniaxial press, at 200 MPa and 120° C., and pressed for 1 minute. Thus, an all-solid-state battery for evaluation was obtained.

3. Evaluation of all Solid-State Batteries

The fabricated all-solid-state cell was constrained at a predetermined constraint pressure by using a restraining jig, after charging at a constant current to 4.55V with 1/10 C, and discharged to 3.0V with a 1 C, constant current to 4.35V with a 1/3 C-constant voltage charge, after performing constant current-constant voltage discharge until 3.00V with a 1/3 C, the constant current charge-discharge test was repeated 200 times in 2 C as a cyclic test. The percentage of discharge capacity at cycle 200 relative to the initial discharge capacity in the cycle test ([200 cycle discharge capacity/initial discharge capacity]×100) was calculated as the discharge capacity retention.

4. Evaluation Results

Table 1 below shows the discharge capacity retention of the solid-state batteries of Example 1 and Comparative Examples 1 and 2. In Table 1 below, the discharge capacity retention ratio in Comparative Example 2 is set to 100, and the discharge capacity retention ratios of each of Example 1 and Comparative Example 1 are shown relative to each other.

TABLE 1

| | Discharge capacity retention |
|---|---|
| Example 1 | 122 |
| Comparative Example 1 | 72 |
| Comparative Example 2 | 100 |

As shown in Table 1, the all-solid-state battery according to Example 1 has superior cycling characteristics as compared with the all-solid-state battery according to Comparative Examples 1 and 2. In the all-solid-state battery according to the Example 1, it is considered that, by removing $SiO_2$ from the granulated body, a void is formed in the active material composite particles, and the expansion of Si at the time of charging is absorbed by the void, so that the expansion amount of the active material composite particles as a whole becomes small. That is, the volume change of the negative electrode with the charge and discharge is reduced, whereby it is possible to suppress an increase in the constraint pressure and the interface peeling and the like, and it is considered that the cycle characteristics are improved.

Note that, in the above embodiment, a case in which a fluorine-containing polymer as a polymer and a hydrofluoric acid treatment as an acid treatment are adopted as a second component has been exemplified in producing the active material composite particles, but it is considered that the same active material composite particles can be formed by an acid treatment even when a material other than this is used. In addition, in the above example, a case in which an all-solid battery is manufactured as a secondary battery for evaluation has been exemplified, but even in a secondary battery other than this, an effect due to an active material composite particle can be expected.

As described above, according to the following method, it is possible to produce active material composite particles having excellent cycle characteristics. That is, the method for producing the active material composite particles of the present disclosure comprises, Step S1: obtaining a granulated body comprising a simple substance of Si as a first component, a component other than the simple substance of Si as a second component, and a polymer, and Step S2: applying acid treatment to the granulated body to remove the second component from the granulated body while leaving the first component and the polymer in the granulated body, thereby forming a void in the granulated body.

REFERENCE SINGS LIST

1 Active material composite particle
1*a* granulated body
1*ax* first component
1*ay* second component
1*az* polymer
1*b* void
100 Secondary battery
10 Negative electrode current collector
20 Negative electrode active material layer
30 Electrolyte layer
40 Positive electrode active material layer
50 Positive electrode current collector

The invention claimed is:

1. A method of producing an active material composite particle, the method comprising:

obtaining a granulated body containing a simple substance of Si as a first component, a component other than the simple substance of Si as a second component, and a polymer; and applying acid treatment to the granulated body to remove the second component from the granulated body while retaining the first component and the polymer in the granulated body, thereby forming a void in the granulated body.

2. The method according to claim 1, wherein the second component is $SiO_2$.

3. The method according to claim 1, wherein the acid treatment comprises hydrofluoric acid treatment.

4. The method according to claim 1, wherein the polymer comprises a fluorine-containing polymer.

5. A method of producing a secondary battery, the method comprising:

obtaining an active material composite particle by the method according to claim 1; and using the active material composite particle to obtain a negative electrode active material layer.

* * * * *